US006730178B2

(12) United States Patent
Miyamoto et al.

(10) Patent No.: US 6,730,178 B2
(45) Date of Patent: May 4, 2004

(54) COATING METHOD BY INTERMETALLIC COMPOUND

(75) Inventors: Yoshinari Miyamoto, 1-14-202, Tsukinoki-cho, Ikeda-shi, Osaka (JP); Kiyotaka Matsuura, 2-2-4, Megumino-Higashi, Eniwa-shi, Hokkaido (JP); Toshio Teramoto, Tokyo (JP)

(73) Assignees: JSR Corporation, Tokyo (JP); Yoshinari Miyamoto, Ikeda (JP); Kiyotaka Matsuura, Eniwa (JP)

( * ) Notice: Subject to any disclaimer, the term of this patent is extended or adjusted under 35 U.S.C. 154(b) by 0 days.

(21) Appl. No.: 09/903,747

(22) Filed: Jul. 13, 2001

(65) Prior Publication Data

US 2002/0031603 A1 Mar. 14, 2002

(30) Foreign Application Priority Data

Jul. 14, 2000 (JP) ........................................ 2000-214226

(51) Int. Cl.$^7$ ............................................... C23C 22/00
(52) U.S. Cl. ...................... 148/240; 148/242; 148/280; 427/190; 427/191; 427/192; 427/205; 427/405; 427/419.1; 427/419.7
(58) Field of Search ................................ 148/240, 242, 148/280; 427/190, 191, 192, 205, 405, 419.1, 419.7

(56) References Cited

U.S. PATENT DOCUMENTS 5,997,604 A * 12/1999 Rafferty et al. ................ 75/233
6,051,277 A * 4/2000 Claussen et al. .......... 427/376.3

FOREIGN PATENT DOCUMENTS

JP          A 12-96206          4/2000

OTHER PUBLICATIONS

*Journal of the Metallurgical Society of Japan*, vol. 32, No. 12, p. 845.

* cited by examiner

*Primary Examiner*—Andrew L. Oltmans
(74) *Attorney, Agent, or Firm*—Oblon, Spivak, McClelland, Maier & Neustadt, P.C.

(57) ABSTRACT

A metallic base material is covered with a coating layer of intermetallic compound, or a plurality of metallic base materials are welded to each other with an intermetallic compound, with reduced energy consumption within a short period of time. First metallic substance 31 in powdery form is piled up on metallic base material 2. Second metallic substance 3 in molten form is delivered onto piling layer 80 of the first substance. Thus, under the control of reaction initiation temperature, coating layer (or building up coating layer) 84 of intermetallic compound having a thickness of hundreds of microns ($\mu$m) to millimeters (mm) is formed on the base material 2 by the self-exothermic reaction between the first substance and the second substance. This method is also useful in the welding of a plurality of metallic base materials to each other with an intermetallic compound. The first substance can be constituted of, for example, Ni, Co or Fe. The second substance can be constituted of, for example, Al or Ti. Each base material may be constituted of a metal common with or homologous to the first substance or second substance. The first substance and the second substance can be used in powdery form or molten form, provided that at least one thereof is used in molten form. The first substance may contain a ceramic for imparting reinforcement.

10 Claims, 4 Drawing Sheets

COATING METHOD BY INTERMETALLIC COMPOUND

FIELD OF THE INVENTION

The present invention relates to a coating method (or bonding method) which is useful in coating a base material with an intermetallic compound or bonding base materials to each other with an intermetallic compound and relates to a coating apparatus therefor. More particularly, the present invention is concerned with a technology which can be applied to, for example, a corrosion resistant coating provided on a turbine blade of aircraft engine, a heat resistant, wear and abrasion resistant coating provided on an exhaust valve of automobile engine and a corrosion resistant, oxidation resistant coating provided on an exhaust system of garbage incinerator and further can be applied to a buildup welding for repairing parts thereof.

BACKGROUND OF THE INVENTION

It is inevitable to develop a light material of high heat resistance as a structural material for use in heat engines accommodated in next-generation automobiles, marine vessels, aerospace equipment and other transport means and also accommodated in thermomotor of energy plants. Intermetallic compounds such as aluminides expected as providing a heat resistant material of high strength are materials which can meet the above requirements, and investigations for putting the intermetallic compounds to practical use, including those on the composition, texture optimization, performance enhancement and processing method for obtaining a desired structure, are being conducted in a number of countries.

It is common practice to coat the surface of a metal material with an intermetallic compound in order to impart a corrosion resistance and a wear and abrasion resistance thereto. However, the principle and method of simply obtaining a coating of intermetallic compound have not yet been established. As the method for obtaining an intermetallic compound, there can be mentioned the diffusion process, the flame spraying process and the combustion synthesis process.

The diffusion process is a process that after another type of metal which can react with the base metal to thereby form an intermetallic compound is applied to the surface of a base material metal by, for example, vapor deposition, the base material is heated and maintained in an elevated temperature, and whereby a reaction layer is formed on the base material surface. In the diffusion process, the diffusion, namely ultralow-velocity mass transfer phenomenon is utilized. Therefore, although there is such an advantage that controlling of the coating thickness of reaction layer is easy, there occurs such a disadvantage that the period of time required for coating formation is as extremely long as several hours to tens of hours. Accordingly, the attained coating thickness is restricted to a small one such as tens of microns or less. Further, the processing is performed at high temperature, so that the effect thereof on the base material cannot be disregarded.

The flame spraying process is a method that, as disclosed in, for example, Japanese Patent Laid-open Publication No. 2000-96206, a layer of alloy containing a specified type of element is piled on a base material by vacuum plasma spraying and thereafter aluminum is thermal-sprayed over the deposited alloy layer so that a coating layer of intermetallic compound is formed by a metallurgical reaction accompanied by heat buildup of aluminum. It is advantageous in that extreme energy consumption is not required because an exothermic reaction can be induced at a relatively low temperature within a relatively short period of time, as compared with the process of directly melting an intermetallic compound at high temperature. However, this process necessitates a large heat source of, for example, plasma, electric arc or laser. The flame spraying process poses such an inherent problem that voids are likely occur in the coating because of the adherence between the coating layer and the base material and because of the entrainment of ambient gas at the flame spraying. Furthermore, the thickness of the coating layer formed by the above process only ranges from about tens of microns to hundreds of microns, even if the alloy layer and the aluminum layer are summed up, because of spraying workability and cost, etc. As a result, there is the danger of cracking or local exfoliation caused by the nonuniformity, brittleness, etc. of formed coating.

The self-propagating high temperature synthesis process, or combustion synthesis process is a process wherein a reaction of compound formation spontaneously proceeds with the generation of high heat of reaction within a short period of time. The process is characterized in that a high-melting-point ceramic or intermetallic compound can be easily synthesized. Since the principle of the combustion synthesis process was discovered by Meljarnov, et al. of the old Soviet Union in 1967, theoretical researches and application developments have been promoted (see Journal of the Metallurgical Society of Japan, vol. 32, No. 12, page 845). The combustion synthesis process is a process that a green compact of a mixture of different types of metals capable of forming an intermetallic compound is placed on a base material surface and the base material is heated under pressure so that a combustion synthesis reaction is induced to thereby accomplish not only formation of an intermetallic compound but also bonding of the intermetallic compound to the base material. The combustion synthesis process, because a self-exothermic reaction is utilized, has such an advantage that the synthesis of coating layer and the bonding thereof to the base material can be simultaneously performed within a short period of time. However, because of a balance between the exothermicity at the synthesis and the heat transfer to the base material, the thickness of the coating layer is limited to large one such as several millimeters or more.

Moreover, the intermetallic compound such as NiAl or TiAl can be utilized at high temperatures such as 800 to 1000° C. and exhibits superior properties as a high-temperature material. Therefore, development researches for the application thereof to engine parts, aerospace mechanical parts, etc. are being promoted, but, despite the excellent properties, ductility required for molding and working cannot be obtained to thereby inhibit the practical use thereof. The intermetallic compound has a high formation energy of about 100 kJ per mol, and the combination of metals is accompanied by an exothermic reaction of high temperature such as 1500 to 2000° C. to thereby enable spontaneous proceeding of a synthetic reaction. Therefore, the combustion synthesis process is one of energy saving not requiring any external heating at high temperature, but controlling of reaction propagation, temperature and texture is difficult. As a result, many problems remain unsolved on the application of intermetallic compound to parts requiring heat resistance. For example, in the conventional combustion synthesis process, different types of metals are mixed together and used in the form of a green compact, so that the different types of metals are simultaneously heated at the same temperature. Consequently, the melting point of one of the metals automatically becomes the reaction initiation temperature, so that the reaction initiation temperature, thus the exothermic temperature resulting from the reaction, and the melt depth of the base material cannot be controlled. In the event of a thin coating layer, it may occur that the bonding strength cannot be enhanced.

As apparent from the above, although the coating of base materials with the intermetallic compound can be effected by, for example, the diffusion process, the flame spraying process and the combustion synthesis process, numerous steps and much energy consumption are inevitable because of the property of the intermetallic compound that working thereof is extremely difficult. Thus, coated members (for example, buildup welded members) cannot be obtained with less energy consumption at low cost within a short period of time.

Therefore, it is an object of the present invention to provide a method of not only simply and efficiently coating a base material with an intermetallic compound but also welding a plurality of base materials so as to bond them together and to provide a coating apparatus employed therefor.

It is another object of the present invention to provide a method of forming a coating layer of intermetallic compound having a thickness of hundreds of microns ($\mu$m) to several millimeters (mm) with reduced energy consumption within a short period of time, and to provide a coating apparatus employed therefor.

It is a further object of the present invention to provide a method of easily controlling a reaction initiation temperature and, irrespective of the thickness of a coating layer, increasing the bonding strength of the coating layer to a base material, and to provide a coating apparatus employed therefor.

It is still a further object of the present invention to provide a method of not only rendering preprocessing (for example, vapor deposition in the diffusion process, piling up of a precursor layer in the flame spraying process and fabrication of a green compact in the combustion synthesis process) unnecessary but also freely and automatically performing coating of a base material surface with an intermetallic compound with the use of a control system (for example, CAD/CAM system) enabling computerized fine control.

It is still a further object of the present invention to provide a method of forming a coating layer of intermetallic compound in an energetically advantageous manner wherein a heat source of relatively low capacity (for example, high-frequency heater or resistance heater) can be employed.

SUMMARY OF THE INVENTION

The inventors have found that, when a first substance is piled up on a base material, and a second substance is delivered onto the first substance and reacted therewith, the thus formed intermetallic compound is fusion united with the base material to thereby enable formation of a coating layer of intermetallic compound on the base material. As a result, the present invention has been completed.

Therefore, according to one aspect of the present invention, there is provided a method of forming a coating layer of an intermetallic compound on a base material, comprising the steps of piling up a first substance on a base material, and delivering a second substance onto the first substance, the second substance reacted with the first substance to thereby form a coating layer of an intermetallic compound on the base material. The present invention is also useful for providing a method of welding a plurality of base materials to each other with an intermetallic compound. Therefore, according to another aspect of the present invention, there is provided a method of welding a plurality of base materials to each other with an intermetallic compound, comprising the steps of piling up a first substance on base materials, and delivering a second substance onto the first substance, the second substance reacted with the first substance to thereby cause the plurality of base materials to be bonded to each other through a coating layer of an intermetallic compound. In these methods, the coating layer may be fusion bonded to each base material so that a building up coating layer is formed on the surface of the base material.

In the methods of the present invention, the first substance can be constituted of, for example, at least one metal selected from the group consisting of nickel, cobalt, iron, niobium, vanadium, molybdenum, tungsten, chromium and tantalum. The second substance can be constituted of, for example, at least one metal selected from the group consisting of aluminum and titanium. The substance constituting the base material or base materials may be any of various metals, for example, a metal or alloy of at least one member selected from the group consisting of iron, nickel, cobalt, aluminum and niobium. Further, in order to increase the bonding strength of the coating layer to the base material, the substance constituting the base material may be at least one metal selected from the group consisting of metals of the first substance and the second substance, or a metal homologous thereto.

The methods of the present invention can be accomplished in various modes, for example, a mode wherein the first substance is piled up in powdery form or molten form on the base material or base materials, and the second substance is delivered in molten form or powdery form onto the piled first substance. In this mode, at least one of the first substance and the second substance is used in molten form.

The first substance may contain a ceramic. In particular, the first substance in powdery form or molten form may contain a powdery or fibrous ceramic constituted of an oxide, carbide, nitride or boride of at least one metal selected from the group consisting of aluminum, yttrium, titanium, zirconium, hafnium and silicon. In the present invention, a coating layer constituted of an intermetallic compound, an intermetallic compound having a ceramic dispersed therein or an intermetallic compound containing a nitride can be formed by the reaction between the first substance and the second substance.

In a further aspect of the present invention, there is provided a method of preparing a three-dimensional molding (or three-dimensional model, or three-dimensional shaped item) with the use of a computerized control system, comprising the steps of piling up a portion of first substance on a base material, and delivering a portion of second substance onto the piled first substance to thereby form a layer of intermetallic compound; and piling up another portion of first substance on the intermetallic compound layer, and delivering another portion of second substance onto the piled first substance to thereby form another layer of intermetallic compound.

The coating apparatus of the present invention is an apparatus for forming a coating layer of intermetallic compound on a base material by the use of a reaction between a first substance and a second substance, which coating apparatus comprises a unit for piling a first substance on a base material, a unit for delivering a second substance onto the first substance, and a unit for melting at least one of the first substance and the second substance.

In the present invention, because the exothermic reaction of materials per se is effectively utilized, not only the intermetallic compound optimized with respect to the composition and texture can be formed but also the coating layer of intermetallic compound (especially, high-melting-point dense welding coating layer or buildup welding coating layer) can be continuously formed under combustion synthesis in a thickness ranging from hundreds of microns ($\mu$m) to several millimeters (mm). Thus, a dense buildup welding coating whose formation has been difficult with conventional technologies can be formed with reduced energy consumption within a short period of time in the present invention. That is, the present invention enables providing an apparatus for practically executing a building up coating of intermetallic compound, the intermetallic compound having high-temperature strength and corrosion resistance but necessitating difficult working, with the utilization of the high formation heat of intermetallic compound, for example, NiAl or TiAl, and providing a process for forming an intermetallic compound coating. From the material point of view, the present invention enables providing a highly functional member of intermetallic compound whose working is extremely difficult in an economic manner.

The method of the present invention is advantageous in that a coating of intermetallic compound can be formed with reduced energy consumption within a short period of time, and enables manufacturing high-performance parts of excellent high temperature heat resisting strength as final products at low cost by streamlining complex processes of the conventional working and metallurgical technologies.

Figure 1:
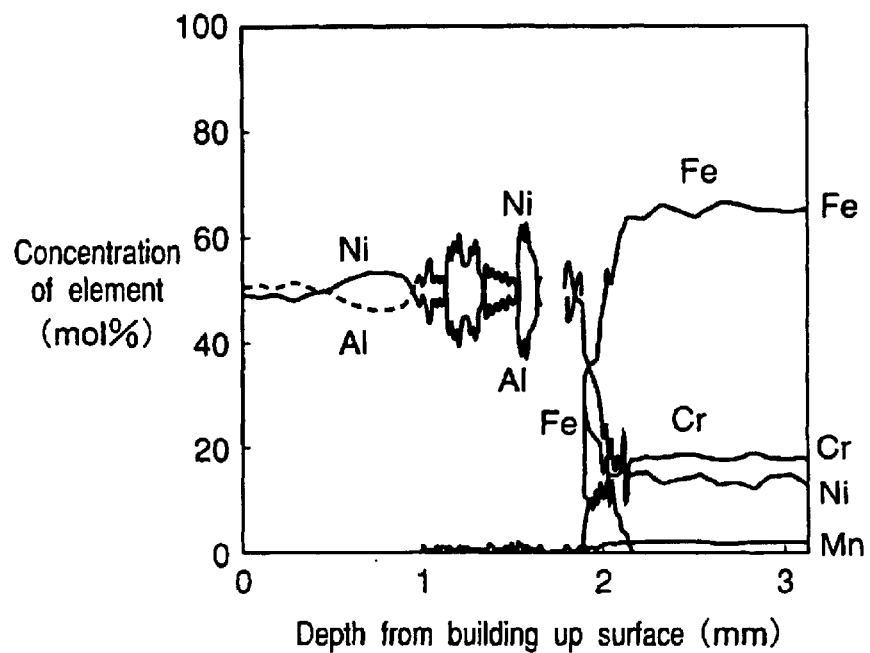
FIG. 1 is a view of element concentration distribution at a bonding interface of buildup welding part and base material.

1: coating or welding apparatus,
2: base material,
3: molten aluminum drop,
10: welding table,
11: common table,
12: heat source,
13: temperature detector,
14: elevation driving mechanism,
20: delivery unit (material unit delivering part),
21: delivery nozzle,
22: high-frequency heater,
23: crucible,
24: aluminum pieces,
25: heat source,
26: temperature detector,
27: piezoelectric ceramic (piezoelectric element),
30: piling unit (material unit piling part),
31: nickel powder,
32: piling nozzle,
33: vibration mechanism,
34: sieve,
40: vacuum,
50: gas,
51: gas feeder,
60: vessel (chamber),
64: temperature detector,
70: control unit,
80: powder piling layer,
81: reaction product part (NiAl element piece),
82: interfacial bonding part with base material,
83: excess nickel powder,
84: first coating layer (buildup welding layer),
85: second coating layer (buildup welding layer),
90: base material,
91: first base material,
92: second base material,
93: coating layer (buildup welding part), and
94: nickel powder piling layer.

DETAILED DESCRIPTION OF PREFERRED EMBODIMENT

In the method of the present invention, a coating layer of intermetallic compound can be formed on a base material with high efficiency by a simple procedure comprising piling up a first substance and delivering a second substance. The terminology "intermetallic compound" used herein, as well known, means a compound which is obtained by a combination of a plurality of metal elements and possesses new properties different from those of component metal elements. The "coating layer" may be referred to as "building up coating layer" or "buildup welding part".

Metal elements for constituting the first substance and the second substance are not particularly limited as long as the intermetallic compound can be formed thereby. For example, such metal elements can be any of metals of Group 2A of the periodic table (e.g., magnesium, calcium and barium), metals of Group 3A of the periodic table (e.g., scandium and yttrium), metals of Group 4A of the periodic table (e.g., titanium and zirconium), metals of Group 5A of the periodic table (e.g., vanadium, niobium and tantalum), metals of Group 6A of the periodic table (e.g., chromium, molybdenum and tungsten), metals of Group 7A of the periodic table (e.g., manganese), metals of Group 8 of the periodic table (e.g., iron, cobalt, nickel, iridium, palladium and platinum), metals of Group 1B of the periodic table (e.g., copper, silver and gold), metals of Group 2B of the periodic table (e.g., zinc), metals of Group 3B of the periodic table (e.g., aluminum, gallium and indium), and metals of Group 4B of the periodic table (e.g., silicon, germanium, tin and lead). The intermetallic compound can be formed by an appropriate combination of the first substance and second substance constituted by different periodic-table metal elements, depending on the intended use. The combination of a plurality of metal elements is not particularly limited.

Metal elements for constituting the first substance and/or the second substance may be used individually or in combination. When used in combination, the metals may be in the form of a mixture or an alloy.

The first substance and the second substance can be chosen appropriately from among the above metals, depending on the desired properties of intermetallic compound (for example, heat resistance, durability, resistance to environment and slidability). For example, the intermetallic compound can be formed by a combination of a plurality of different periodic-table metal elements, selected from among metals of Group 4A of the periodic table (e.g., titanium and zirconium), metals of Group 5A of the periodic table (e.g., vanadium, niobium and tantalum), metals of Group 6A of the periodic table (e.g., chromium, molybdenum and tungsten), metals of Group 8 of the periodic table (e.g., iron, cobalt and nickel), metals of Group 3B of the periodic table (e.g., aluminum, gallium and indium) and metals of Group 4B of the periodic table (e.g., silicon, germanium and tin). More specifically, when it is intended to improve the properties as a high-temperature structural material, the first substance can be selected from among, for example, elements of Group 8 of the periodic table (e.g., nickel, cobalt and iron), elements of Group 5A of the periodic table (e.g., niobium, vanadium and tantalum) and elements of Group 6A of the periodic table (e.g., molybdenum, tungsten and chromium), while the second substance can be selected from among, for example, metals of Group 8 of the periodic table (e.g., iron, cobalt and nickel) and metals of Group 4A of the periodic table (e.g., titanium).

Although the base material may be constituted of, for example, a ceramic, the base material is generally constituted of a metal. The substance or metal for constituting the base material can consist of at least one metal selected from among those of the first substance and the second substance (metal common with the first substance and/or second substance) or a metal homologous thereto (for example, metal of different species but common in periodic-table group) in order to enhance the adherence to the coating layer of intermetallic compound. In particular, the base material may be constituted of an alloy such as an iron based alloy, a nickel based alloy, a cobalt based alloy, an aluminum based alloy or a niobium based alloy. For example, in the use requiring the above heat resistance, the base material can be formed of a metal or alloy constituted of at least one member selected from among metals of Group 8 of the periodic table (e.g., iron, cobalt and nickel) and metals of Group 5A of the periodic table (e.g., niobium, vanadium and tantalum).

The first substance may contain a ceramic in order to reinforce the coating layer. The ceramic generally has a melting point which is higher than the temperature at which the first substance and the second substance are reacted. The ceramic is often composed of a metal such as aluminum, yttrium, titanium, zirconium, hafnium, silicon, magnesium, tungsten. thallium, vanadium or niobium and at least one nonmetal selected from among, for example, oxygen, carbon, nitrogen and boron. However, it may be one composed of nonmetals (e.g., carbon and boron, or nitrogen and boron). The metal component can generally consist of at least one metal selected from among, for example, aluminum, yttrium, titanium, zirconium, hafnium and silicon. The ceramic may be an oxide type ceramic (e.g., alumina, zirconia, magnesia, yttria, mullite or barium titanate), or a nonoxide type ceramic. As for the nonoxide type ceramic, for example, any of carbides (e.g., silicon carbide, boron carbide, titanium carbide, hafnium carbide, zirconium carbide, tungsten carbide, vanadium carbide and niobium carbide), nitrides (e.g., silicon nitride, boron nitride, aluminum nitride, titanium nitride, hafnium nitride, zirconium nitride, thallium nitride, vanadium nitride and niobium nitride) and borides (e.g., titanium boride, zirconium boride, hafnium boride and niobium boride) can be used. These ceramics can be used individually or in combination.

The ceramic can be used in powdery form (e.g., powder having an average particle diameter of about 0.1 to 20 $\mu$m, preferably 0.5 to 10 $\mu$m) or in fibrous form (e.g., fiber having an average diameter of about 0.1 to 20 $\mu$m, preferably 1 to 15 $\mu$m, and having an average length of about 10 to 10000 $\mu$m, preferably 50 to 3000 $\mu$m). The fibrous ceramic may be a whisker.

The ratio of ceramic can generally be selected within the range of about 0.1 to 100 parts by weight, preferably 1 to 50 parts by weight, per 100 parts by weight of the first substance. The ceramic may be applied in the form of a mixture of the ceramic and the first substance or in the form of a laminate composed of a layer of ceramic and a layer of first substance piled on each other.

According to necessity, a carbon fiber may be used as a reinforcing fiber together with the first substance.

In the piling step, the first substance is piled up (or applied) in powdery form or molten form on the base material to thereby form a layer of first substance on the base material. In the delivery step, the second substance is delivered (or applied) in molten form or powdery form onto the piled first substance to thereby react the second substance with the first substance. Thus, a coating layer of intermetallic compound can be formed on the base material. At least one of the first substance and the second substance must be used in molten form. That is, in the method of the present invention, the coating layer of intermetallic compound can be formed on the base material (1) by sequentially performing piling of the first substance in powdery form on the base material and delivery of the second substance in molten form onto the piled first substance, or (2) by sequentially performing piling of the first substance in molten form, i.e., in the form of a liquid-phase metal on the base material and delivery of the second substance in powdery form onto the piled first substance, or (3) by sequentially performing piling of the first substance in molten form on the base material and delivery of the second substance in molten form onto the piled first substance.

When the first substance or the second substance is used in powdery form, the average particle size of the powder is generally in the range of about 0.1 to 100 $\mu$m, preferably 1 to 70 $\mu$m, and still preferably 1 to 50 $\mu$m. The piling of the first substance can be performed with the use of common piling (spreading or discharge) unit. When the first substance or the second substance is used in molten form, it can be discharged in linear form or in the form of a curtain. With respect to the second substance, it can generally be delivered in the form of drops through a delivery unit such as a dropping device. The amount of second substance delivered onto the piled first substance can be selected in conformity with the metal composition ratio of intermetallic compound.

In the method of the present invention, as different from the process in which a green compact of a first substance and a second substance is heated to thereby effect a combustion synthesis, the second substance is applied onto the first substance and the intermetallic compound is formed with the utilization of self-exothermic reaction between the first substance and the second substance. Therefore, the method of the present invention is advantageous in that the reaction initiation temperature can be controlled easily and freely by independently regulating the temperature of each of the first substance and the second substance. The melt temperature of each of the first substance and the second substance can be selected within the range of, for example, about 500 to 1500° C. (preferably 800 to 1500° C.) in accordance with, for example, the type of metal and the composition ratio of intermetallic compound.

The reaction between the first substance and the second substance can be performed in various atmospheres including vacuum. The reaction is generally carried out in an inert gas atmosphere or a reactive gas atmosphere. As the inert gas, for example, helium or argon gas may be used. As the reactive gas, for example, nitrogen, carbon dioxide or oxygenated gas (e.g., air) may be used. The intermetallic compound containing products of reaction between the first substance and/or second substance and the reactive gas (for example, nitrides) can be formed by the reaction in the reactive gas atmosphere. When the first substance containing the above ceramic is used, the coating layer constituted of the intermetallic compound having the ceramic dispersed therein can be formed.

In the method of the present invention, because the high formation heat generated by the reaction between the first substance and the second substance can be utilized, the base material and the coating layer of intermetallic compound can be united together with a high bonding strength therebetween by a fusion of the base material. Therefore, the method of the present invention is useful for providing the coating on the base material or for modifying the surface of the base material.

Also, the method of the present invention is useful as means for bonding (welding) a plurality of base materials to each other with the intermetallic compound. Namely, the first substance is piled up on and between neighboring regions of a plurality of base materials and the second substance is delivered onto the first substance. As a result, a high heat of reaction is generated to thereby form the intermetallic compound so that the neighboring base materials can be welded and bonded to each other with the intermetallic compound. In this method, welding can be performed between a plurality of base materials which can be of the same type or different types. That is, even if the plurality of base materials are of different types, they can be bonded to each other securely and strongly by selecting metal components which form the intermetallic compound and which are common with or homologous to structural components of the base materials as the first substance and second substance.

Furthermore, the method of the present invention is useful for forming a buildup welding layer (especially a building up coating layer fusion bonded to a base material) on a base material surface, or for buildup welding a plurality of base materials, by sequentially performing the piling of the first substance and the delivery of the second substance. Still further, the building up coating enables increasing the strength and corrosion resistance of base material and enables recovering or repairing any damaged base material, so that the method of the present invention is also useful as means for recovering or repairing a base material.

In the formation of the coating layer by the above buildup coating or welding, continued welding path (locus of welding bead) can be formed by continuously or intermittently applying the second substance to the first substance.

The thickness of the coating layer constituted of the intermetallic compound can be selected within a broad range, for example, the range of about several microns (for example, 10 μm) to several millimeters (for example, 5 mm). That is, in the present invention, not only a thin coating layer of about several microns (for example, 10 μm) to hundreds of microns (for example, 500 μm) but also a thick coating layer of about 0.1 to 1 mm thickness can be formed by regulating, for example, the amount of applied first substance and second substance. The present invention is advantageous in that the coating layer of intermetallic compound having a thickness of about hundreds of microns (for example, 200 μm) to several millimeters (for example, 5 mm) can be formed with reduced energy consumption within a short period of time.

Repeating the sequence of forming a piling layer of first substance on the coating layer (layer of intermetallic compound) and delivering the second substance on the piling layer (buildup coating operation) enables laminating of building up coating layers, thereby realizing a three-dimensional molding.

Now, the present invention will be described in greater detail with reference to a particular method using nickel/aluminum.

When, for example, a nickel powder is first fed to a surface of metal base material and subsequently a molten aluminum metal (pure aluminum or an alloy thereof) is dropped thereon, both the metals upon contacting each other undergo a violent exothermic reaction. Thus, a nickel/aluminum intermetallic compound is formed and due to the heat of reaction, bonding thereof to the metal base material. As a result, a buildup welding of intermetallic compound is accomplished.

For example, nickel powder of 5 μm average particle diameter is piled up on a base material of about 10 mm diameter and about 6 mm thickness. Molten aluminum is dropped in a proportion equimolar to the nickel powder on a piling layer of nickel powder (the temperature of molten aluminum drops changed from 1000 to 1200° C.). As a result of an observation of the reaction behavior of both the metals in ordinary-temperature atmosphere and the properties of reaction product, it is found that, irrespective of the temperatures of the molten aluminum drops, the molten aluminum drops and the piling layer of nickel powder undergo a combustion synthesis reaction to thereby form a particulate intermetallic compound. In this system, the composition homogeneity and void residual depend on the temperature of molten aluminum drops. For example, when the temperature of molten aluminum drops is 1100° C. or higher, an intermetallic compound of NiAl containing nickel and aluminum in equimolar proportion is formed. On the other hand, when the temperature of molten aluminum drops is 1000° C., intermetallic compounds of $Ni_3Al$ and $NiAl_3$ other than NiAl are partially formed to thereby result in an incomplete reaction. Even the product of this incomplete reaction can be formed into a single-phase compound of NiAl by heating the product at 1200° C. for 2 hours or more.

From the viewpoint of the void residual of products, when the temperature of molten aluminum drops is 1100° C., the product is consisting of a single phase of NiAl. This product has a density equal to 65% of the calculated one of NiAl and hence contains voids at a ratio of 35% by volume. On the other hand, when the temperature of molten aluminum drops is 1200° C., the density of the product is nearly equal to the calculated density, so that the void residual is on an ignorable level.

A bonding of adjacent coating layers (reaction products) has been investigated by piling up another nickel powder on a base material along the reaction product (coating layer) previously formed thereon (on a site of the base material adjacent to the coating layer) and by dropping molten aluminum on the resultant piling layer of nickel powder. Further, a piling up bonding of coating layers (bonded reaction products) has been investigated by piling up still another nickel powder on the adjacent coating layers (bonded reaction products) and by dropping molten aluminum on the resultant piling layer of nickel powder. As a result, it has been found that, when the bonding of reaction products is observed with the temperature of molten aluminum drops fixed at 1200° C., both the horizontal bonding of adjacent coatings and the vertical bonding of piled coatings are satisfactory.

For example, in an atmosphere of argon gas, 1.6 g (0.027 mol) of nickel powder of about 45 µm average particle diameter is piled up on a 2 mm thick disk of SUS 316 stainless steel, and 0.7 g (0.027 mol) of molten aluminum is dropped on the resultant piling layer of nickel powder. With respect to the reaction temperature, when the stainless steel disk and the nickel powder are heated at 330° C. and the molten aluminum drops at 1200° C., both the nickel and the aluminum upon contacting each other undergo a violent exothermic reaction. As a result, molten NiAl is formed and is immediately solidified on the stainless steel. Upon an observation of cooled specimen, it is found that NiAl is formed in the form of welding beads and bonded with the stainless steel. With respect to a section crossing bonding interface, a texture observation and an analysis by EPMA (electron probe microanalyzer) have been carried out. As a result, it has been found that the violent heat generation at the synthesis of NiAl causes melting of the stainless steel to a depth of about 100 µm. Furthermore, as apparent from the concentration distribution of elements across a bonding interface of buildup welding layer and stainless steel base material as shown in FIG. 1, a compound having a composition within NiAl solid solution limits is formed throughout the building up part, although a slight deviation from stoichiometric composition occurs in the vicinity of bonding interface. In FIG. 1, the axis of ordinates on the left side indicates element concentrations while the axis of ordinates on the right side indicates element names. The axis of abscissas indicates the distance (depth) from buildup coating surface.

That is, the method of the present invention enables synthesis of NiAl from nickel powder and molten aluminum drops, and enables simultaneous formation of a coating layer (buildup welding layer) on a base material of stainless steel. Moreover, the piling of nickel powder and the dropping of molten aluminum can be controlled by a control unit (computerized control). Therefore, a two-dimensional NiAl coating layer can be formed by dropping molten aluminum on the layer of nickel powder piled up on a base material and carrying out the synthesis of NiAl element and bonding of adjacent NiAl elements through dropping of molten aluminum. Furthermore, the coating layer can be built up and thickened by overlaying the previously formed NiAl layer with a layer of nickel powder and dropping molten aluminum so that not only synthesis of NiAl element and bonding of adjacent NiAl elements are performed on the underlayer NiAl element but also bonding with and laminating on the underlayer NiAl element are effected.

A coating layer of TiAl intermetallic compound can be formed by piling up titanium powder in place of nickel powder. Ceramic powder or ceramic fiber can be mixed in the nickel powder to thereby obtain a composite coating. Therefore, the method of the present invention can be expanded into various modes. For example, a ceramic composite can be obtained by mixing an appropriate amount of ceramic (e.g., $TiB_2$ or $Al_2O_3$ powder) into metal powder. Further, the application of a coating with gradient composition can be obtained by changing the composition of piled powder in accordance with the advance of building up (i.e., in the direction of thickness).

Further, other than the above nickel powder and titanium powder, a powder of pure metal, such as cobalt, iron, niobium or the like, a powder of an alloy, a powder of a mixture thereof, or a mixture of such a metal component and an additive such as ceramic particles or fiber. The metal base material can be constituted of, for example, an iron based alloy, a nickel based alloy, a cobalt based alloy, an aluminum based alloy, a niobium based alloy, or a metal of the same type as that of building up intermetallic compound or homologous thereto (e.g., metal common in periodic table groups).

With respect to the control of reaction between molten aluminum drops and nickel metal powder, a variety of compound phases such as NiAl, $Ni_3Al$, $Al_3Ni_2$, TiAl and $TiAl_3$ are present in the Al—Ni and Al—Ti systems. Furthermore, the reaction between molten aluminum drops and such a counterpart metal would not necessarily ensure the synthesis of desired compound phase only. Further, a reaction zone, a density of formed phase and a control of texture are important factors for coating properties and welding properties. In the control of these factors, a reaction control can be performed by optimizing the relationships with the temperatures of molten aluminum drops and base material, drop size, dropping rate and particle diameter of metal powder.

With respect to the properties of coating layer, the position accuracy, density, void ratio, texture, strength, toughness, heat stress, heat resistance, corrosion resistance, wear and abrasion resistance, etc. of coating part can be optimized and controlled. Accordingly, the coating layer together with the base material can be subjected to various treatments, such as heat treatment, HIP treatment and surface coating treatment. According to necessity, finishing can be additionally performed. These treatments may be carried out in order to realize a high-quality coating or welding which is free from cracking, breakage, stress concentration and other failure.

The elements for practically performing and constituting the method of the present invention include means for delivering molten aluminum (or means for dropping molten aluminum), means for piling up metal powder, control of zones of reaction between molten aluminum and metal powder layer, control of reaction phase, control of void ratio and texture of intermetallic compound coating layer and systemization. Major elements will be described in detail below. As aforementioned, the following "metal powder" or "powder" is not limited to metals only, and it may refer to a mixture of metal powder and ceramic powder or to a ceramic powder.

The means for piling up metal powder is a means that while a piling unit for piling up metal powder on a base material is moved above a base table or welding table, an appropriate amount of metal powder is fed from the piling unit onto the base table or welding table and thereafter the piling unit is returned to the original position or is evacuated to the circumference section of the base table or welding table.

The means for delivering or dropping molten aluminum is a means that molten aluminum is continuously or noncontinuously (intermittently) delivered or dropped through a nozzle, by application of a vibration pre-load to a molten aluminum pot filled with an inert gas (e.g., argon gas) through a diaphragm by means of a piezoelectric element, or by application of pressure to the inert gas (e.g., argon gas) by means of a pulse valve. For example, the drop size, temperature and dropping rate of molten aluminum can be controlled.

The control of the overall apparatus can be performed by a control system (control by, for example, a computer) for carrying out, in an atmosphere of argon gas, a series of operations including the delivery or dropping of molten aluminum based on numerical data as to configuration or pattern, corresponding moving of the welding table, piling of metal powder, etc. In this connection, the process atmosphere is not limited to argon gas, and, in order to effect a reaction for nitride formation, the inside of reaction vessel (chamber) may be filled with a reactive gas such as nitrogen. Also, in order to avoid the presence or mixing of impurities, the inside of reaction vessel may be in vacuum. By integrating the above elements, the overall apparatus can constitute a coating system or reactive buildup welding system based on the intermetallic compound.

As apparent from the above, the coating apparatus or welding apparatus of the present invention is satisfactory if it is provided with a unit for piling up the first substance on the base material, a unit for delivering the second substance onto the first substance and a unit for melting at least one of the first substance and the second substance. This coating or welding apparatus is generally provided with a base table or welding table on which the base material can be disposed or held.

In the above coating or welding apparatus, the piling unit and the delivery unit are at least capable of relative movement in the X-axis and/or Y-axis direction. Further, the table may be capable of moving in the Z-axis direction, depending on the configuration of the base material. Moreover, the base table or welding table may be at least capable of moving relative to the piling unit and the delivery unit in the Z-axis direction. Further, the table may be capable of moving relative to the piling unit and the delivery unit in the X-axis and/or Y-axis direction. The base table or welding table may rotatably hold the base material, depending on the spatial configuration of the base material. For example, when a three-dimensional coating is applied to a base material of spatial or three-dimensional configuration having a surface of curvature (e.g., turbine blade), bead locus is required in not only the X-axis direction and/or Y-axis direction but also the Z-axis direction. This is true with respect to the buildup coating or welding as well. Therefore, in the case of three-dimensional coating (including buildup coating and buildup welding), it is advantageous that the piling unit and the delivery unit can be moved relative to the base material in not only the X-axis and/or Y-axis direction but also in the Z-axis direction. The use of this technique enables forming a three-dimensional structure (e.g., shell-like structure) of intermetallic compound on the surface of a base material of spatial or three-dimensional configuration (e.g., turbine blade). Thus, this technique can be utilized in the preparation of a three-dimensional molding (or a three-dimensional model, three-dimensional shaping) by the use of a computerized control system.

Figure 2:
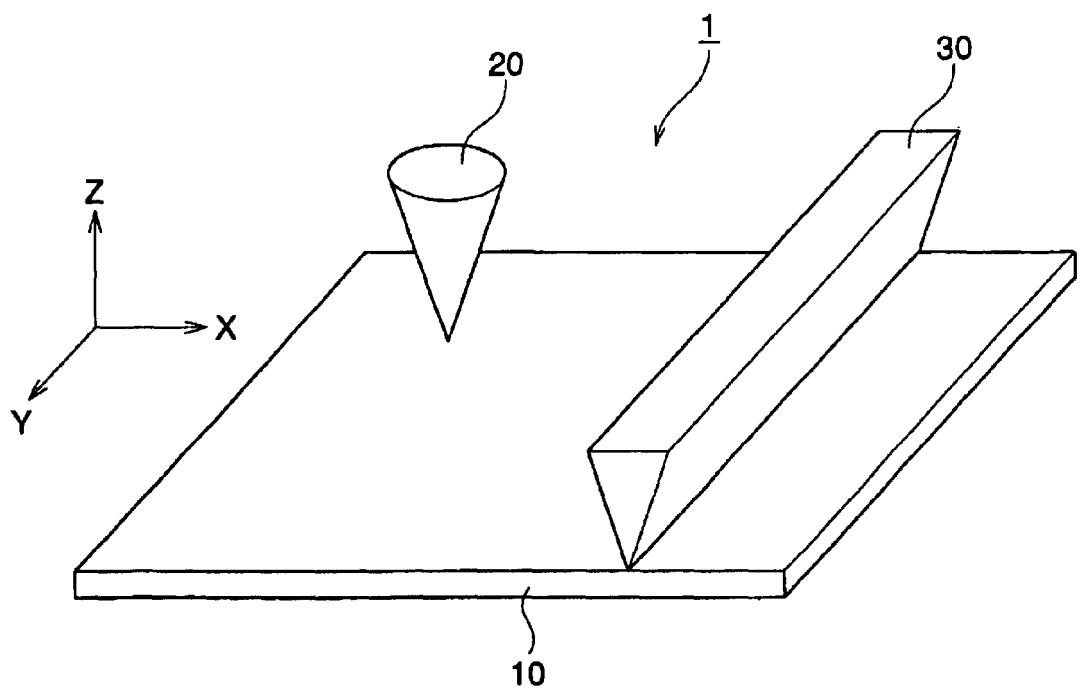
FIG. 2 is a conceptual view of the apparatus of the present invention.

The apparatus and method according to the present invention will be described below with reference to, for example, a process of buildup welding by NiAl, referring to FIGS. 2 to 6. FIG. 2 is a conceptual view of the apparatus of the present invention, and FIG. 3 is a schematic view of one form of the apparatus of the present invention.

The coating or welding apparatus 1 includes welding table (or base table) 10 on which base material 2 can be mounted and which can be moved in the Z-axis direction; delivery unit (or material unit delivery part) 20 which can be moved to any position in the X-axis and/or Y-axis direction above the welding table and which can deliver molten aluminum; and piling unit (or material unit piling part) 30 which can be moved to in either the X-axis or the Y-axis direction above the welding table 10 and which can pile up powdery nickel on the base material 2.

Figure 3:
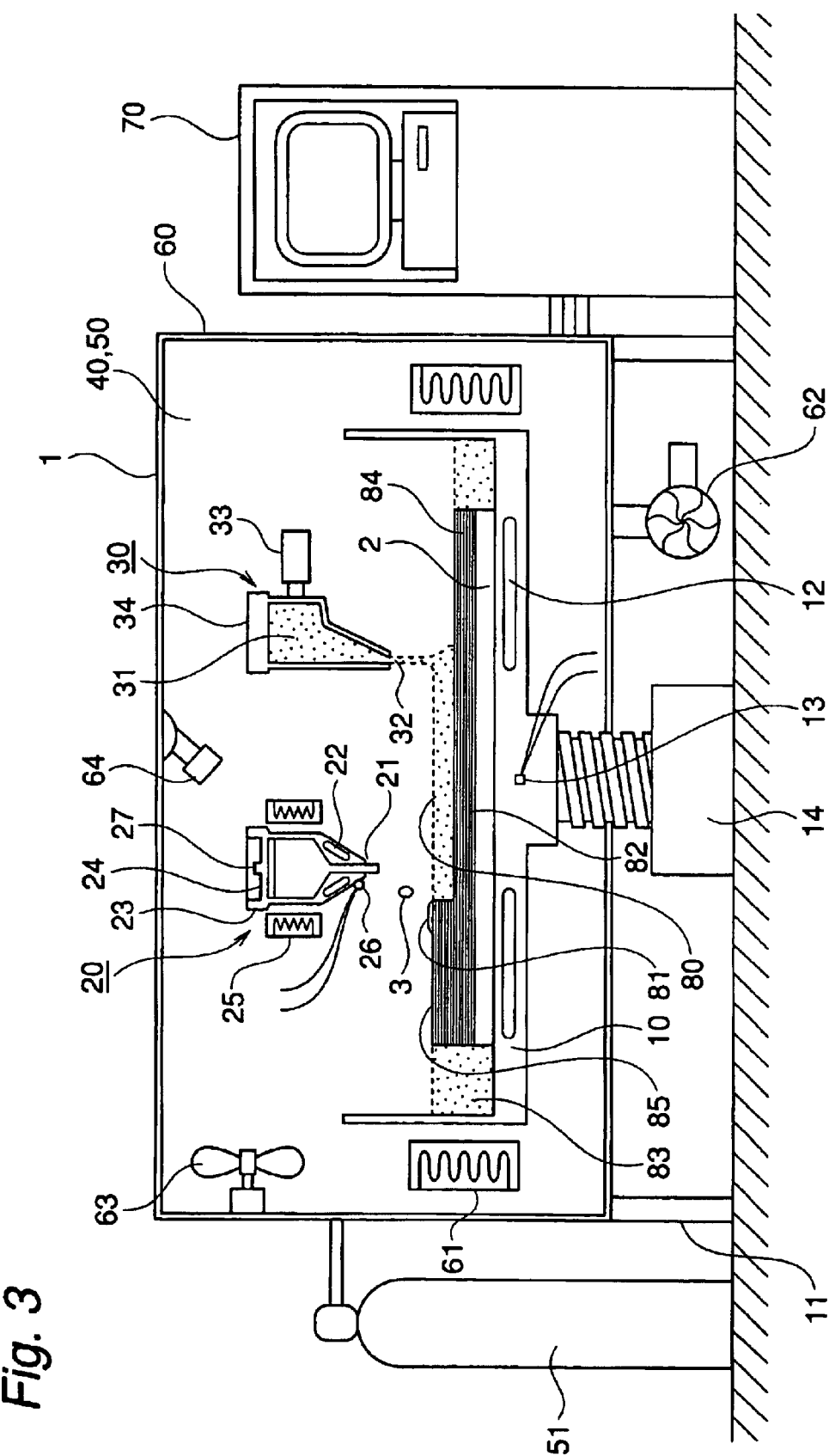
FIG. 3 is a schematic view of one form of the apparatus of the present invention.

As shown in FIG. 3, the apparatus 1 is airtightly enclosed by vessel (or chamber) 60 wherein the state of vacuum 40 or an atmosphere of gas (inert gas such as argon or reactive gas such as nitrogen 50) is provided. Inside the vessel 60, there are provided heating means (e.g., high-frequency heat source) 61 for heating the inside of the vessel 60; and driving source 62 of vacuum means (e.g., pump) for exhausting the inside of the vessel 60 to thereby produce vacuum 40 or driving source 63 of gas circulating means (e.g., blower) for circulation of gas 50. The temperature of the atmosphere within the vessel 60 is measured by temperature detector 64.

The apparatus 1 is provided with common table 11 for supporting the vessel (chamber) 60 provided with welding table 10, delivery unit 20 and piling unit 30. The inside or bottom of the welding table 10 is provided with heating means (heating source such as heater 12) for regulating the temperature of piled powder layer (piling layer). The temperature of the welding table 10 is detected by temperature detector 13. The welding table 10 can be elevated inside the vessel (chamber) 60 by means of driving device 14 equipped with elevation mechanism. Outside the apparatus 1, there is provided gas feeder 51 for feeding inert gas or reactive gas 50 into the vessel (chamber) 60.

The delivery unit 20 functions as a liquid-phase dropping device for molten metal, and is provided with delivery nozzle 21 and crucible (or melt pot) 23 arranged above the nozzle 21. In the crucible (or melt pot) 23, aluminum pieces 24 are melted and held in molten form. Further, the delivery unit 20 is provided with piezoelectric element (e.g., piezoelectric ceramic 27) for delivering aluminum molten in the crucible (or melt pot) 23 through nozzle 21 as drops. Around the nozzle 21, there are provided heating means (high-frequency heater or resistance heater 22) arranged so as to surround the nozzle 21 and further provided heating means (heat source 25) for regulating the temperature of molten metal in the crucible (or melt pot) 23, arranged inside or outside the delivery unit 21. The temperature of delivery part of the delivery unit 20 can be detected by temperature detector 26. The configuration of distal end opening of the nozzle 21 is not particularly limited, and may be circular or in the form of slender slits. In the delivery of molten metal from the delivery unit 20, the coating or welding work efficiency can be enhanced by performing a wide delivery of molten metal drops 3.

The piling unit 30 functioning as a powder feeder accommodates nickel powder 31 thereinside, and nozzle 32 is provided at a distal end of the piling unit 30. Above the nozzle 32, there are provided vibration mechanism 33 for generating vibration and sieve 34 for effecting appropriate falling and feeding of nickel powder. The piling unit 30 for nickel powder is moved over the welding table 10 in a sweeping manner while the sieve 34 is vibrated by means of the vibration mechanism 33, so that nickel powder 31 can be fed uniformly on the welding table 10 at a thickness of hundreds of microns ($\mu$m) and hence powder piling layer 80 can be formed. The configuration of distal end opening of the nozzle 32 is not particularly limited, and may be circular or in the form of slender slits. In the spreading of nickel powder, the piling layer 80 can be formed within a short period of time by effecting a wide spreading of nickel powder 31. When there is provided a variation means capable of regulating the nozzle slit width, the amount of fed nickel powder 31 can be dynamically varied.

In the delivery unit 20, aluminum pieces 24 are heated and melted by the heating means (high-frequency heater or resistance heater 22). Molten aluminum is delivered from the melt pot 23 through the nozzle 21 as drops (for example, drops with a diameter of hundreds of microns ($\mu$m)) 3 by the vibration pressure of the piezoelectric ceramic 27. Molten aluminum drops 3 fall on the piling layer of nickel powder 80 formed previously on the base material 2 placed on the welding table 10. Thus, a combustion synthesis reaction occurs to thereby form minute NiAl element pieces (reaction product parts) 81. Therefore, molten metal 3 is dropped continuously or noncontinuously while the delivery unit 20 is moved in the X-axis and/or Y-axis direction along a desired design configuration (pattern) of object. As a result, the first coating layer of intermetallic compound (or buildup welding layer, intermetallic compound layer) 84 consisting of NiAl element layers (reaction product parts) 81 which is aggregated or united together through interfacial bonding part 82 in the same plane on the base material 2 can be formed.

When it is desired to increase the thickness of coating layer (height of welding building up), the welding table 10 is firstly lowered in the Z-axis direction as much as the thickness D of the piling layer 80 of nickel powder to be piled up, and the nickel powder piling unit 30 is moved secondly in a sweeping manner above the welding table 10 to thereby form the nickel powder piling layer 80, and the piling unit 30 is thirdly returned to the original position, and finally NiAl element pieces (reaction product parts) 81 is produced in the above manner to thereby form the second coating layer of intermetallic compound 85. As a result, a two-dimensional or three-dimensional forming (three-dimensional molding) can be performed. After repeating this process as many times as required, nickel powder not having been used in coating formation can be recovered in recovery part 83 arranged in a peripheral zone. Thus, formation of desired coating layer (or buildup welding 85) consisting of intermetallic compound NiAl can be obtained. This series of operations can automatically be controlled by a controller (computerized control unit 70) arranged outside the apparatus 1.

Figure 5:
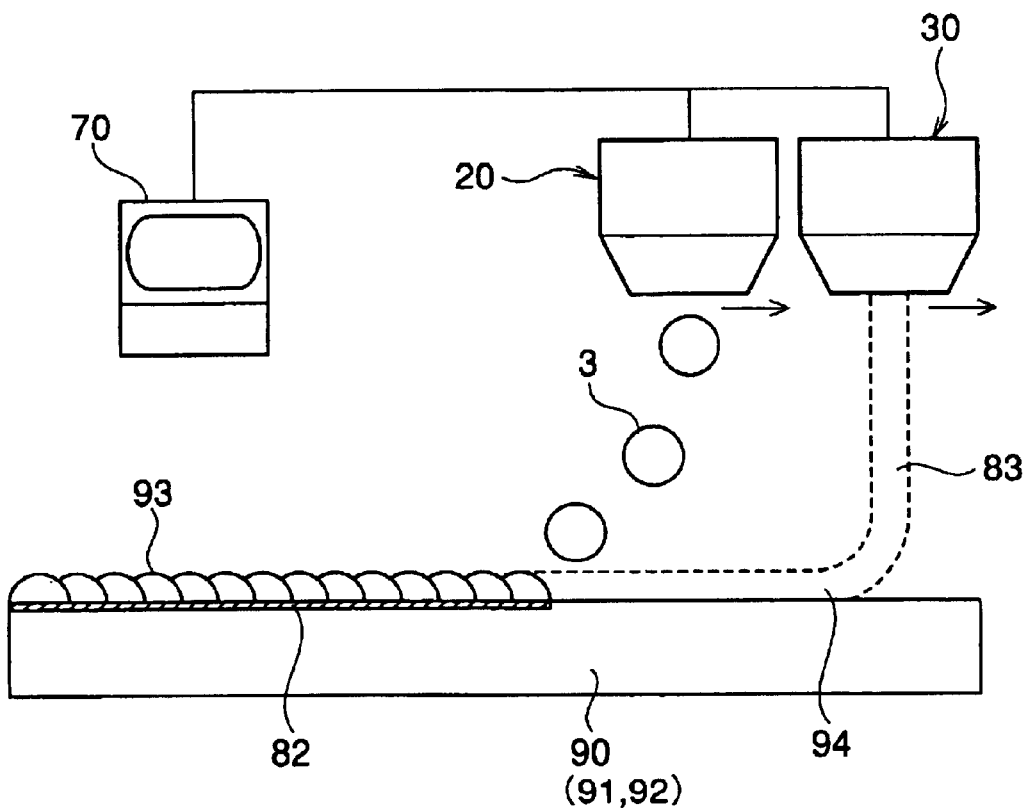
FIG. 5 is a schematic view showing a relationship of arrangement between a coating apparatus and a coating layer (buildup welding part) formed on a base material.
Figure 6:
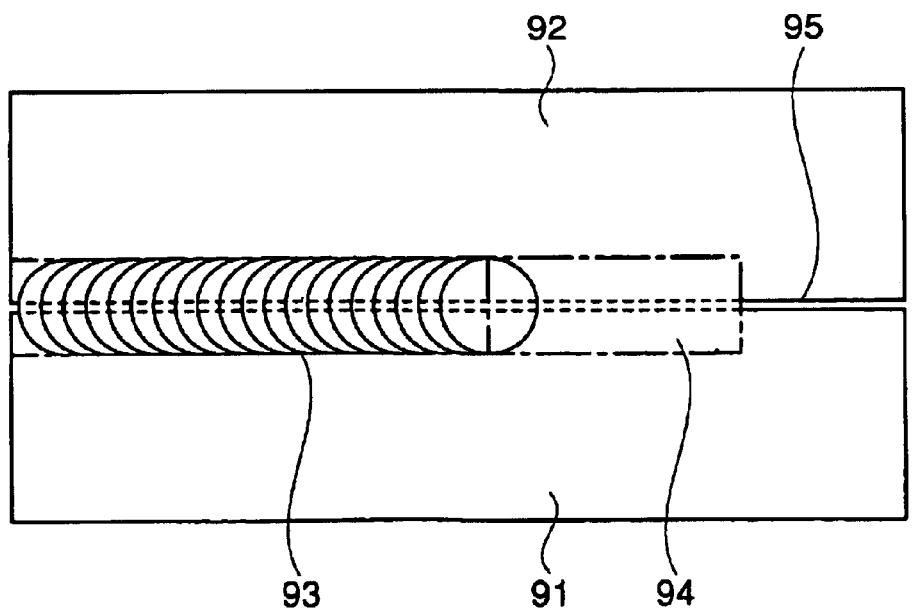
FIG. 6 is a plan showing the welding part of FIG. 5.

Moreover, the use of the above coating apparatus and coating method enables welding a plurality of base materials (for example, buildup welding) as well as the coating of base material (or buildup coating). FIG. 5 is a schematic view showing a relationship of arrangement between the coating apparatus and the coating layer (buildup welding part) formed on the base material. FIG. 6 is a plan showing the welding part of FIG. 5.

In one form, the base material 90 consists of first base material 91 and second base material 92. It is shown that gap 95 is provided at a welding joint part of the first and second base materials 91, 92. Depending on the thickness and other conditions of base materials, any gap 95 may not be provided between the plurality of base materials.

The delivery unit 20 and the piling unit 30, as aforementioned, can be moved in the X-Y plane in mutual relation. From the piling unit 30 moved prior to the delivery unit 20, nickel powder 83 is discharged along the joint part of the base material 90. Thus, piling layer of nickel powder 94 is formed on the joint part of the base materials 91, 92. Subsequently, molten aluminum drops 3 from the delivery unit 20 are caused to fall on the nickel powder piling layer 94. Exothermic reaction occurs to thereby form NiAl reaction product part 81. Continuously overlaid coating layer (continuous buildup welding part 93) of intermetallic compound can be formed by repeating these operations, namely, continuously or intermittently dropping molten aluminum 3 at arbitrary positions along the nickel powder piling layer 94 while receiving signals from the control unit 70. Although not shown, the building up of the welding part 93 can be thickened by repeating the above operations so as to overlay the welding part 93 with coating layer (second welding part 93(2)). Therefore, for example, the necessity to increase the strength of base material/welding part can be easily coped with. That coating layers (or building up layers) can be bonded to each other in the vertical direction to thereby provide a coating layer laminate as mentioned above.

Figure 4:
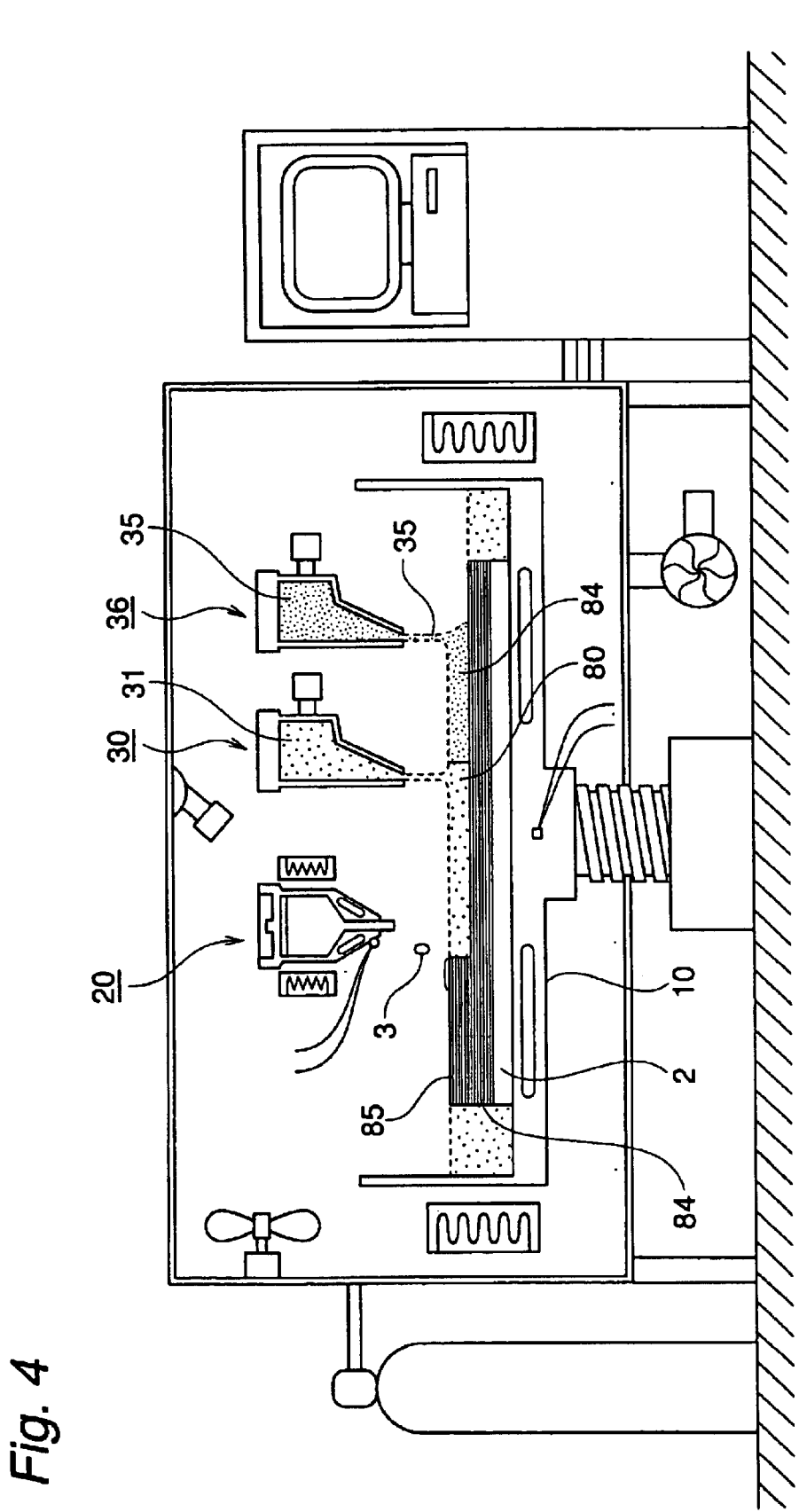
FIG. 4 is a schematic view showing the coating method of the present invention and another form of the coating apparatus of the present invention.

FIG. 4 is a schematic view showing the coating method and coating apparatus of the present invention in varied mode and form.

The material fed from the piling unit 30 is not limited to nickel powder 31 per se, and may be a mixture of nickel powder and a metal such as aluminum powder added thereto for the purpose of reaction control. The material may also be a mixture obtained by mixing ceramic powder 35 into a metal such as nickel prior to piling. In that instance, filler-reinforced welding part (composite welding part) 85 containing the ceramic as a filler or reinforcement can be formed.

In this form of apparatus, as shown in FIG. 4, there are provided first piling unit 30 capable of feeding nickel powder and second piling unit 36 capable of feeding ceramic powder 35, so that, along the X-axis and/or Y-axis direction, ceramic powder 35 and nickel powder 31 are fed in an appropriate ratio onto the base material 2 mounted on the welding table 10 to thereby form piling layer 84. This method enables forming coating layer or welding part 85 of ceramic-dispersed or reinforced intermetallic compound. Further, welding part 85 with gradient component ratio can be formed by carrying out a plurality of piling operations or a plurality of coating layer overlaying operations wherein the powders are allocated with a gradient in the thickness direction.

In the method of welding while piling the reaction product, in order to ensure the dimensional precision and material denseness of welding part 85, means, not shown, for implementing various workings (for example, cutting, grinding, polishing, pickling, etc.) on the upper surface of arbitrary welding part for each or a plurality of coatings or weldings or noncontinuously may be provided within the apparatus of the present invention.

With respect to the moving performance of the apparatus, in the above form, the welding table 10 is movable in the Z-axis direction, the delivery unit 20 is movable to any arbitrary position in the X-Y plane and the piling unit 30 is movable in the X-axis or Y-axis direction. However, the piling unit 30 either alone or together with the other piling unit 36 shown in FIG. 4 may be movable to any arbitrary position in the X-Y plane for the purpose of effecting a gradient allocation of nickel powder 31 in the X-Y plane or for the purpose of shortening the time required for producing a coating member or welding member. Further, the apparatus may be so constructed that the welding table 10 is fixed and the delivery unit 20 is movable not only in the direction of height, i.e., Z-axis direction but also to any arbitrary position in the X-Y plane, and that the piling unit 30 is movable to any arbitrary position in the X-Y plane, or is movable to any arbitrary position in either the X-axis direction or the Y-axis direction.

Moreover, in order to three-dimensionally coat a base material of spatial or three-dimensional configuration (for example, turbine blade), the piling unit 30 and the delivery unit 20 may be movable in not only at least one of the X-axis direction and Y-axis direction but also the Z-axis direction. In the performing of three-dimensional coating, the locus of welding part coating bead may be created on the basis of, for example, three-dimensional design data of base material (for example, blade) by CAD, three-dimensional coordinate data obtained by a three-dimensional coordinate meter or coordinate data obtained by a direction sensor or position sensor disposed in front of the piling unit (or piling part). Alternatively, the locus may be created on the basis of a combination of such coordinate data.

In the above description, the apparatus is so constructed that nickel powder is piled up on the base material and molten aluminum is dropped thereon. However, the piling unit 30 is provided with a new heater (not shown) so that molten nickel is dropped on the base material, to form molten nickel layer and molten aluminum is dropped on the molten nickel layer. As a result, the intermetallic compound is formed. This method is disadvantageous in that nickel of high melting point must be melted to thereby necessitate increased energy consumption, resulting in diminishing of the energy saving effect. However, this method is advantageous in that a denser nickel layer can be obtained to thereby enable forming a sound coating layer (or buildup welding coating layer) with respect to which the danger of void occurrence in the internal texture of the coating is reduced.

The construction of the apparatus can also be such that the piling unit 30 is provided with a new heater (not shown) As a result, after molten nickel is dropped on the base material, to thereby form a molten nickel layer, aluminum without being melted is delivered on the molten nickel layer in powdery form. Thus, the intermetallic compound is formed. In this construction, the arrangement of the above delivery unit 20 and piling unit 30 is reversed so that the delivery unit is charged with nickel pieces or powder while the piling unit is charged with aluminum powder. This method is also disadvantageous in that nickel of high melting point must be melted to thereby necessitate increased energy consumption, resulting in diminishing of the energy saving effect. However, in this method, the amount of consumed energy is less than in the above melting of both nickel and aluminum.

With respect to each of the piling unit (piling device) for feeding metal powder and the piling unit (piling device) for feeding ceramic, it is not needed to constitute the same of a single unit. Each of the piling units may be constituted of a plurality of units. Also, the delivery unit (delivery device) is not limited to a single unit and can be constituted of a plurality of units. A plurality of coating units, each of which consists of one piling unit and one delivery unit, may be provided in parallel in the X-axis direction and/or Y-axis direction.

By using the coating method and coating apparatus according to the present invention in the above manner, a laminate of coating layers (or buildup coating layers) constituted of the intermetallic compound can be formed. Further, a coating layer (or buildup coating layer) on a surface of base material of three-dimensional configuration can be also formed. As a result, a three-dimensional molding can be realized.

As aforementioned, the formation of a coating of intermetallic compound is conventionally performed by, for example, the diffusion process, the flame spraying process and the combustion synthesis process. However, in these processes a multiplicity of process steps and high energy consumption are inevitable because of the inherent properties of materials used. On the contrary, in the method of the present invention, it can be regarded as a mode of combustion synthesis process because the synthesis of coating layer and the bonding thereof to a base material are simultaneously carried out with the use of an exothermic reaction between different types of metals. In the method of the present invention, the exothermic reaction of materials per se by the combustion synthesis reaction can be effectively utilized. Thus, the method of the present invention is advantageous in that the coating application can be accomplished with reduced energy consumption within a short period of time, thereby providing low-cost buildup welding members.

A marked difference of the method of the present invention from the conventional combustion synthesis process resides in that the reaction initiation temperature can be controlled. Namely, in the conventional combustion synthesis process, different types of metals are mixed together and used in the form of a green compact. Therefore, the different types of metals are heated at the same temperature. Consequently, the temperature at which one of the metals is melted automatically becomes the reaction initiation temperature. On the contrary, in the method of the present invention, the different types of metals are separately fed, so that the temperatures thereof can be controlled independently. As a result, the reaction initiation temperature can be freely controlled. Capability of controlling the reaction initiation temperature means capability of freely controlling the exothermic temperature by the reaction. Accordingly, the melt depth of base material can be controlled so that increasing of the bonding strength with respect to not only thick coatings but also thin coatings can be realized.

Moreover, the conventional combustion synthesis process has a drawback in that, even if it is intended to increase the mechanical strength of reaction product by adding, for example, particulate or fibrous ceramic, the heat of reaction is absorbed thereby with the result that the promotion of reaction is inhibited. Therefore, the amount of added reinforcing particles is limited. On the contrary, in the method of the present invention, the reaction initiation temperature can be set for high temperatures exceeding the melting point of one of the metals, so that the heat absorbed by ceramic particles can be compensated. Consequently, any lowering of the degree of synthetic reaction completion caused by an increase of the addition amount thereof can be avoided.

Furthermore, the present invention enables providing highly functional parts, endowed with excellent properties such as high strength, heat resistance and wear and abrasion resistance of the intermetallic compound, within a short period of time, and enables providing a process which is amicable to earth environment. For example, with respect to environmental pollution, the application of the coating welding with the high temperature resisting intermetallic compound according to the present invention to the structural material for combustion/exhaust system of a burning furnace enables increasing the heat resistance of the burning furnace. As a result, the combustion temperature can be raised to thereby reduce the discharge of environmentally hazardous substances such as dioxin. Further, the reduction of energy consumed in the building up of intermetallic compound contributes to the inhibition of the occurrence of a factor of earth temperature rise, such as carbon dioxide, to thereby enable providing measures to environment degradation. Therefore, the present invention, by providing measures for solving the problem on the practical application of intermetallic compound coating and providing highly functional welding members (or coating members), enables meeting the needs of a wide range of industrial fields. Still further, the capability of automatically providing a coating of free configuration on a base material surface with the use of CAD/CAM system is an important feature of the method of the present invention.

EXAMPLE

The present invention will now be described in greater detail with reference to the following Example, to which, however, the scope of the present invention is in no way limited.

EXAMPLE

About 1.5 g of Ni powder is pilled up on a stainless steel plate of 2 mm thickness and about 0.7 g of molten Al is dropped on the piled powder to thereby effect a reaction therebetween. In this way, an experiment of synthesizing intermetallic compound NiAl was conducted. Because the NiAl formation heat being as large as 118 kJ/mol, it was expected that a surface portion of the stainless steel plate would be melted and bonded to the NiAl by the heat generation at the reaction. The temperature of Al melt was set for 1000° C., 1100° C. and 1200° C., and the Ni powder and the stainless steel plate were not preheated. After the reaction, the microtexture of specimen sections was observed through an optical microscope and an SEM (scanning electron microscope). Further, the concentration distribution of elements across a section perpendicular to a bonding interface was measured by EPMA.

When the temperature of Al melt was 1100° C. or higher, the Ni powder and the Al melt reacted completely. As a result, that intermetallic compound NiAl was formed throughout a coating layer of 13 mm width and 2 mm thickness. Surface portion of the stainless steel plate was melted by the heat of reaction, so that the intermetallic compound NiAl and the stainless steel plate were bonded to each other. When the temperature of Al melt was 1000° C., the Ni powder and the Al melt did not completely react. As a result, not only NiAl but also other Al—Ni intermetallic compounds were formed. However, by maintaining the reaction product at 1200° C. for 2 hr, the intermetallic compound of NiAl monophase was formed. The stainless steel plate could be linearly coated by continuously feeding the Ni powder and the Al melt drops. It is apparent from these results that the method and apparatus of the present invention enable forming a coating layer of large thickness such as about 1 to 2 mm through simple operations. Therefore, the method and apparatus of the present invention are useful as partial coating means wherein parts of a base material surface can be selectively coated.

The present invention, through simple operations including piling of the first substance and delivery of the second substance, enables easily and efficiently coating the base material with the intermetallic compound and enables welding and bonding a plurality of base materials to each other. Further, the present invention enables forming a coating layer of intermetallic compound having a thickness of hundreds of microns ($\mu$m) to several millimeters (mm) with reduced energy consumption within a short period of time. Still further, the present invention, because of separate feedings of different types of metals, enables easily controlling the reaction initiation temperature. Therefore, the bonding strength between base material and coating layer can be increased, irrespective of the thickness of the coating layer. Still further, in the present invention preprocessing (for example, vapor deposition in the diffusion process, piling up of a precursor layer in the flame spraying process and fabrication of a green compact in the combustion synthesis process) is unnecessary. Furthermore, coating of a base material surface with the intermetallic compound can be formed freely and automatically performed with the use of CAD/CAM system permitting computerized fine control. Also, in the present invention, the coating layer of intermetallic compound can be formed in an energetically advantageous manner wherein a heat source of relatively low capacity (for example, high-frequency heater or resistance heater) can be employed.

What is claimed is:

1. A method of welding a plurality of base materials to each other with an intermetallic compound, comprising the steps of:
    piling up a first substance in powdery form or molten form on the base materials, and
    delivering a second substance in powdery form or molten form onto the first substance,
    the second substance reacted with the first substance to thereby cause the plurality of base materials to be bonded to each other through a coating layer of an intermetallic compound, and
    at least one of the first substance and the second substance is in molten form,
    and wherein each of the first substance and the second substance comprises at least one metal.

2. The method as claimed in claim 1, wherein the first substance is in powdery form or molten form and additionally contains a powdery or fibrous ceramic comprising an oxide, carbide, nitride or boride of at least one metal selected from the group consisting of aluminum, yttrium, titanium, zirconium, hafnium and silicon.

3. The method as claimed in claim 1, wherein said coating layer of an intermetallic compound is fused to the base materials.

4. The method as claimed in claim 1, wherein the first substance comprises at least one metal selected from the group consisting of nickel, cobalt, iron, niobium, vanadium, molybdenum, tungsten, chromium and tantalum.

5. The method as claimed in claim 1, wherein the second substance comprises at least one metal selected from the group consisting of aluminum and titanium.

6. The method as claimed in claim 1, wherein the base materials independently comprise a substance which is a metal or alloy of at least one member selected from the group consisting of iron, nickel, cobalt, aluminum and niobium.

7. The method as claimed in claim 1, wherein the base materials independently comprise a substance which is at least one metal selected from the group consisting of metals of the first substance, metals other than metals of the first substance but in the same group thereof of the periodic table, metals of the second substance, and metals other than metals of the second substance but in the same group thereof of the periodic table.

8. The method as claimed in claim 1, wherein the first substance additionally contains a ceramic.

9. The method as claimed in claim 1, wherein a coating layer comprising an intermetallic compound, an intermetallic compound having a ceramic dispersed therein, or an intermetallic compound containing a nitride is formed by the reaction between the first substance and the second substance.

10. A method of preparing a three-dimensional molding with the use of a computerized control system, comprising the steps of:
    piling up a portion of first substance on a base material, and delivering a portion of second substance onto the piled first substance to thereby form a layer of intermetallic compound; and
    piling up another portion of first substance on the intermetallic compound layer, and delivering another portion of second substance onto the piled first substance to thereby form another layer of intermetallic compound.

* * * * *